United States Patent [19]

Magner

[11] 4,421,434
[45] Dec. 20, 1983

[54] CLAMP MEMBERS

[75] Inventor: Bengt Magner, Mellösa, Sweden

[73] Assignee: Opto-Systems Ltd., United Kingdom

[21] Appl. No.: 224,524

[22] PCT Filed: Apr. 30, 1980

[86] PCT No.: PCT/SE80/00128
§ 371 Date: Jan. 17, 1981
§ 102(e) Date: Nov. 14, 1980

[87] PCT Pub. No.: WO80/02587
PCT Pub. Date: Nov. 27, 1980

[30] Foreign Application Priority Data

May 17, 1979 [SE] Sweden .................. 7904328

[51] Int. Cl.³ .................................. F16B 7/00
[52] U.S. Cl. .................. 403/175; 403/205; 403/403
[58] Field of Search ........... 403/205, 403, 191, 233, 403/174, 178, 218, 385, 175

[56] References Cited

U.S. PATENT DOCUMENTS

| 998,904 | 7/1911 | Jacobs | 403/174 X |
|---|---|---|---|
| 1,150,781 | 8/1915 | Louden . | |
| 1,257,455 | 2/1918 | Braun . | |
| 1,261,213 | 4/1918 | Clay | 403/233 |
| 1,818,172 | 8/1931 | Sutherland | 403/205 |
| 2,037,980 | 4/1936 | Heartz . | |
| 2,101,317 | 12/1937 | Lemieux | 403/385 X |
| 2,879,087 | 3/1959 | Haglund . | |
| 3,021,159 | 2/1962 | Back | 403/191 |
| 4,283,152 | 8/1981 | Smith et al. | 403/233 X |

FOREIGN PATENT DOCUMENTS

| 1287983 | 2/1962 | France . | |
| 2404139 | 9/1977 | France . | |
| 419599 | 4/1947 | Italy | 403/218 |
| 257502 | 8/1947 | Switzerland . | |

Primary Examiner—Andrew V. Kundrat
Attorney, Agent, or Firm—Browdy and Neimark

[57] ABSTRACT

For use in constructing a framework comprising a plurality of elongate rectangular-section elements such as square-section tubes, a kit comprising a plurality of clamp members (such as A) each having at least one first part (10) defining a portion of a socket, a second part defining a portion of a recess or channel, and fixing means (15) whereby the clamp member can be secured to a like clamp member to form a clamp assembly. Selected ones of the clamp members of the kit can be secured together to form a plurality of clamping assemblies, the number of different clamping assemblies constructable being greater than the number of clamp members.

At least one outer wall of a clamp member can have a depression (22) for a head (24a) of a fastener (24) whose stem projects outwardly of the clamp member, either via an aperture (23) therein or via a gap between adjacent clamp members, to enable auxiliary fittings such as wall panels etc. to be secured to the framework.

29 Claims, 18 Drawing Figures

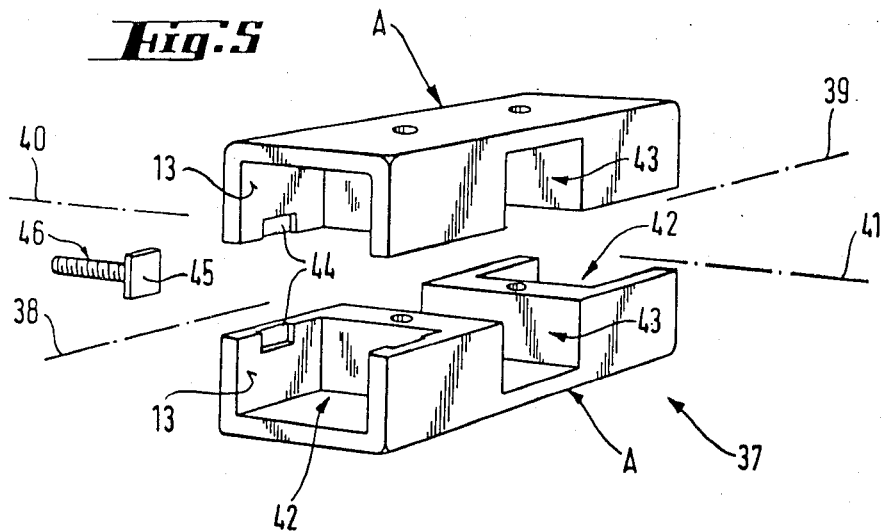
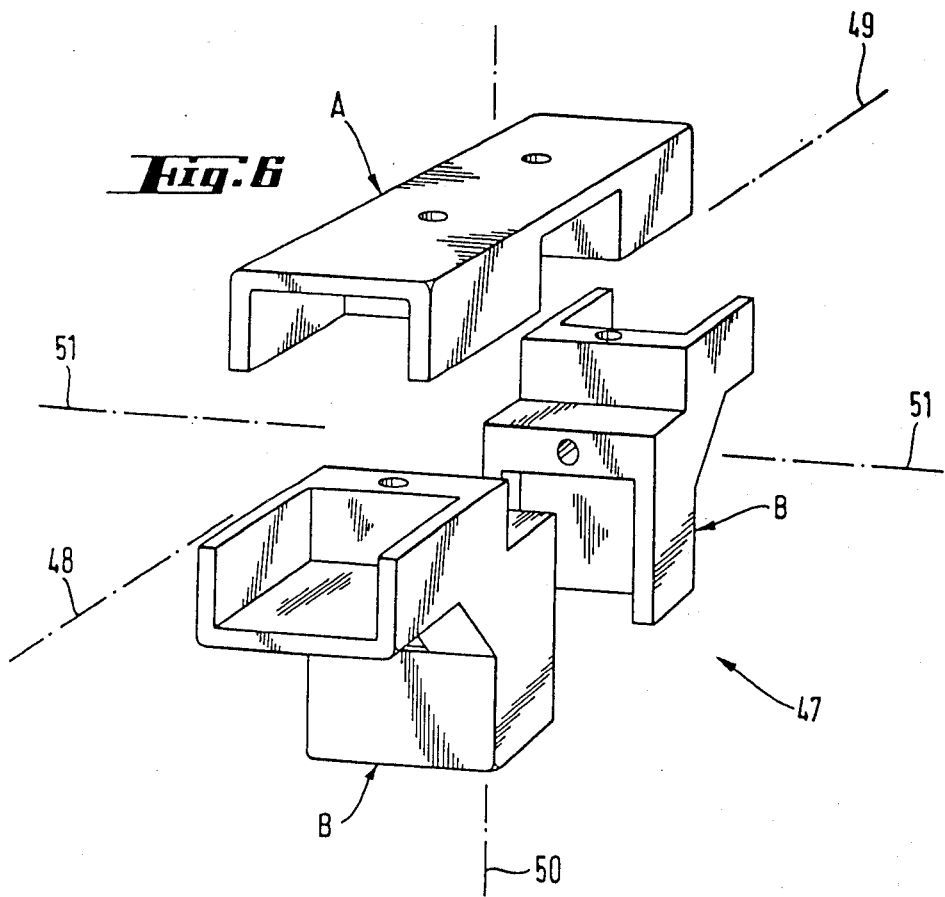

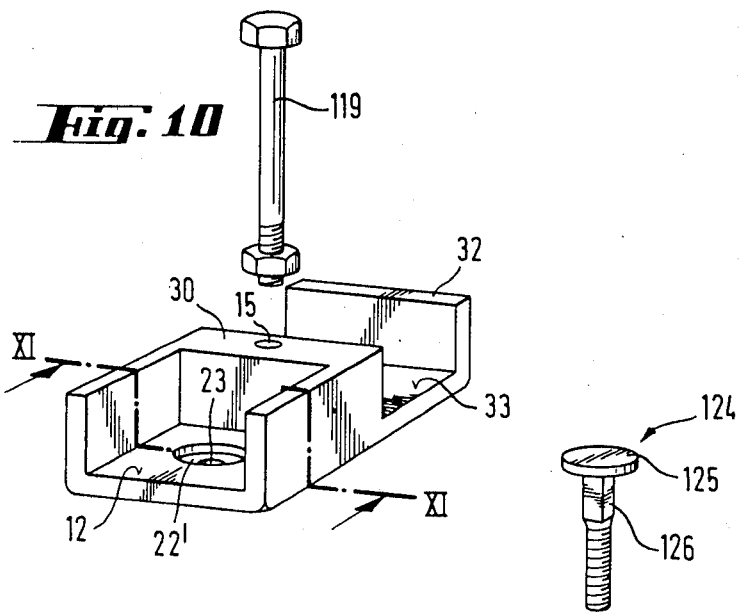
Fig. 10
Fig. 12
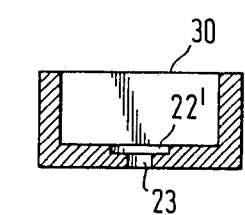
Fig. 11
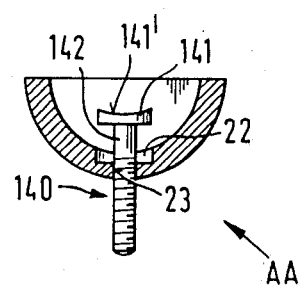
Fig. 13

CLAMP MEMBERS

This invention relates generally to clamp members for use in clamp assemblies provided to unite a plurality of elongated elements such as tubes or rods constituting a readily mountable and readily demountable framework. Frameworks of this sort can be used for permanent structures such as bookshelves or other shelves, but they are particularly suitable for use in demountable structures used for display, sales and the like in shops, exhibitions and wherever a permanent structure is undesirable.

An object of the present invention is to provide an improved clamp member suitable for use as part of a clamping assembly in such a framework.

Accordingly, the invention provides a clamp member, being part of a kit comprising a plurality of different clamp members assemblable with the aid of fixing means to different types of clamp assemblies for uniting at least two one said elongate elements such as rods or tubes. Each clamp member has at least one first part defining a portion of a recess for engaging an end of an elongate element, and one second part defining a portion of a through-channel for engaging another elongate element disposed at right angles to the aforementioned elongate element. Each first and second part is limited by outer walls having internal and external faces. Each first part recess is inside the clamp member and terminated by a transverse block having one top face and two opposite side faces, one side face of the transverse block defining an end wall face of the respective first part recess and thus constituting a dead-end-socket for the end portion of the elongate element, and the second side face of the transverse block defining a portion of a side wall face of the through-channel.

Preferably, the fixing means are located inside the clamp member between the socket portion and the through-channel portion and are arranged in the transverse block, conveniently adjacent the central axial region of the adjacent socket portion.

The fixing means can be in the form of an aperture passing through the member, enabling two such members to be united by a screw or bolt. Alternatively, the fixing means can comprise a pin or recess on the clamp member capable of snap or frictional engagement with a complementary recess or pin on a second similar clamp member.

The first part and the second part are so shaped that they can engage first and second elongate elements arranged at right angles to each other.

The clamp member can have one or more further parts corresponding to said first part to enable an assembly to have two or more sockets.

In one practical realization of the invention the clamp member is produced in four different forms. A first form of clamp member (member A) comprises a pair of aligned and oppositely directed first parts each constituting a half-portion of a socket for an end of a square elongate element, the sockets being aligned, and separated one from the other by an interspace constituting a half-portion of the through-channel.

A second form of clamp member (member B) is an angle member and comprises two limbs arranged at right angles to each other, each limb having an end portion (as in member A) to constitute a respective first part and the apex of the two limbs being cut-away to constitute a second-part defining a quarter portion of the through-channel disposed at right angles to each limb.

A third form of clamp member (member C) has one first part and one second part, the second part being provided with an upstanding side wall and defining a half-portion of the through-channel.

A fourth form of clamp member (member D) is similar to member C, save that the end wall of the channel is omitted and a base thereof terminates in a chamfered edge assembly. Clamp member (D) has thus one first part and one second part, the second part defining a portion of the through-channel and being in the form of a plate extending away from the first part of one side thereof and having its free edge bevelled to be capable of forming a half of a miter joint.

The first and the second parts of the clamp member can be generally U-shaped in cross-section, having planar inner and outer walls including a flat base wall and flat side walls extending at right angles thereto. Preferably, the socket and recess in an assembled clamp are square in cross-section, and the height of the side walls in the clamp member is less than half the width of the base wall between the internal faces of the side walls to enable two such clamp members to embrace an end portion of an elongate element having square cross-section and to clamp it between them.

The invention further includes a clamp member of the aforesaid, or other, generally similar type, i.e. a clamp member assemblable with at least one other clamp member to form a clamp assembly for uniting at least two elongate elements such as as rods or tubes, and having at least two parts, each defining a portion of a recess for engaging one elongate element and being limited by outer walls having external and internal faces, wherein in the internal face of at least one of the outer walls a depression is arranged for accomodating at least a part of a head of a fastener element having a head and a therefrom protruding elongate stem, the depression being associated with an aperture through which the stem can pass to the outside of the clamp member.

The depression can be associated with an aperture passing through the outer wall and through which the stem of the fastener can pass. Usually, the depression will surround the aperture. The outer end of the aperture, i.e. where it passes through an outer face of the clamp member, can be closed by a knock-out plug which conserves the appearance of the clamp member when a fastener is not required.

The depression can also be formed in an edge portion of an outer wall which, in use, faces a corresponding edge of a second similar clamp member and is spaced therefrom in the clamped condition. The stem of a fastener can then extend outwardly through the gap between the two clamp members. Preferably, depressions are formed in the edges of corresponding outer walls of each clamp member, so that the head of the fastener can engage depressions in both clamp members, the stem projecting via the gap between them.

Preferably, the depression is non-circular or is offset so that with an appropriately shaped fastener head, the fastener is restrained against rotation when in position. Conveniently, the depression is rectangular in plan and in cross-section.

At least one of the external faces of the clamp members can be provided with two- or three-dimensional decorations.

The invention further includes a clamp assembly comprising a plurality of clamp members as aforesaid secured together in a clamping relationship with elongate elements of a framework. Preferably, at least one fastener has its head captive in the assembly and has a stem projecting outwardly therefrom.

The invention also provides a clamp assembly, for use in a framework comprising a plurality of rectangular-section elongate elements, comprising a plurality of clamp members interconnected to have at least one rectangular-section socket having two complementary portions, each defined by a separate one of the clamp members, and a rectangular-section recess having two or more portions, each defined by a separate one of the clamp members, the axes of the socket and the recess being arranged at right angles, and fixing means enabling the clamp members to be disposed in clamping relationship with at least two rectangular-section elongate elements, at least one engaged by the socket, and at least one other by the recess. Preferably the socket and recess are square in cross-section and their axes are co-planar.

The invention will be described further, by way of example, with reference to the accompanying drawings, wherein:

FIGS. 5 to 9 are perspective exploded views of various clamp assemblies, each conforming to the invention and each composed of a plurality of the clamp members of FIGS. 1 to 4;

FIG. 10 is a perspective view of the clamp member C of FIG. 3, but modified;

FIG. 11 is a cross-section along the line XI—XI in FIG. 10;

FIG. 12 is a perspective view of a fastener for use with the clamp assembly of FIG. 10, FIG. 13 is a cross-section, similar to that of FIG. 11, through a clamp assembly for cylindrical elements, and FIGS. 14 to 19 show examples of clamp assemblies made of decorated clamp members.

Figure 7:
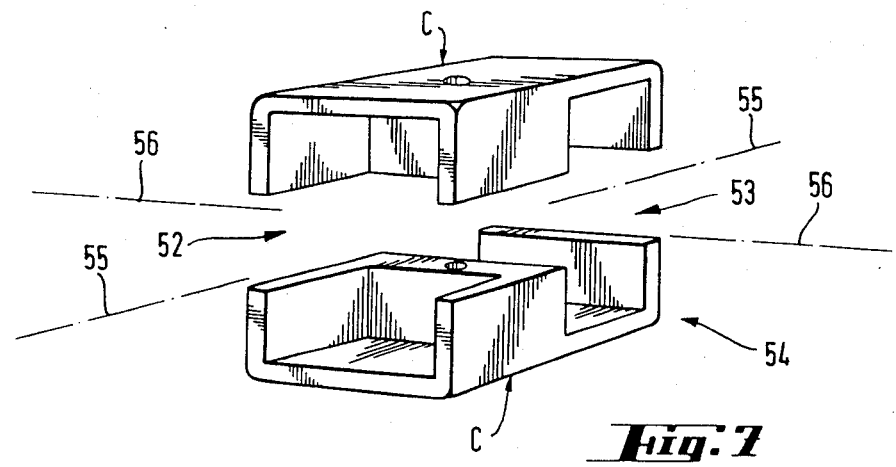
Figure 8:
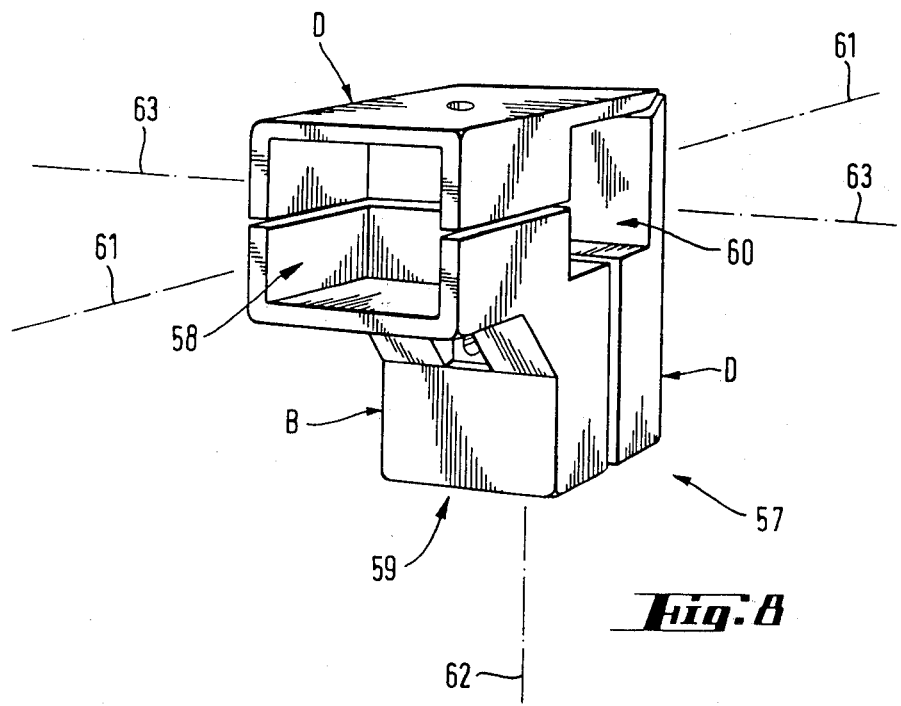
Figure 9:
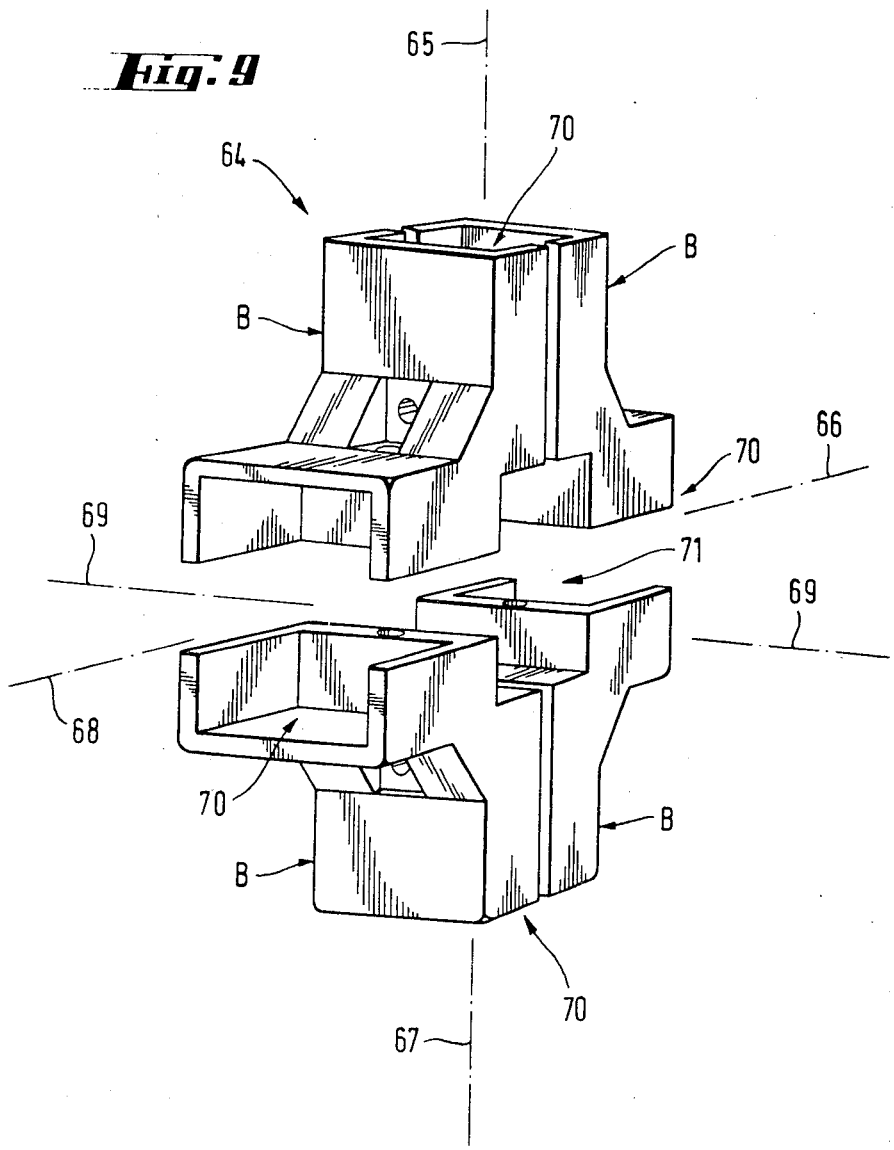
Figure 14:
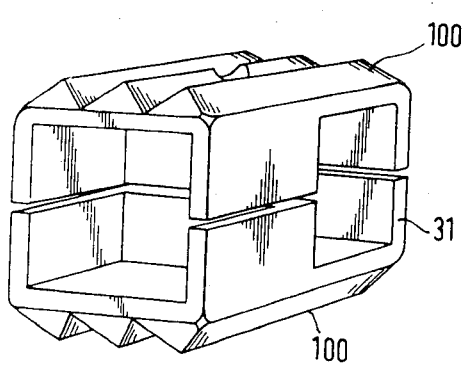
Figure 15:
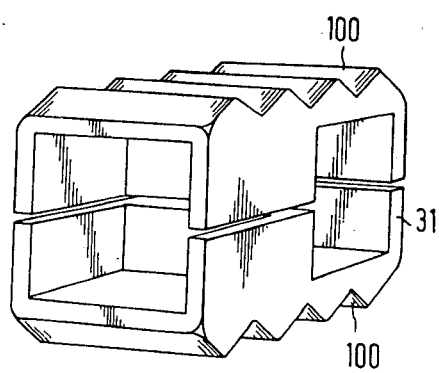
Figure 16:
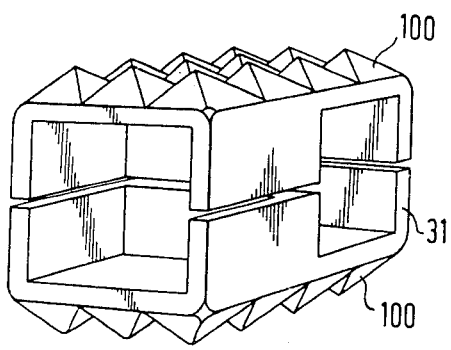
Figure 17:
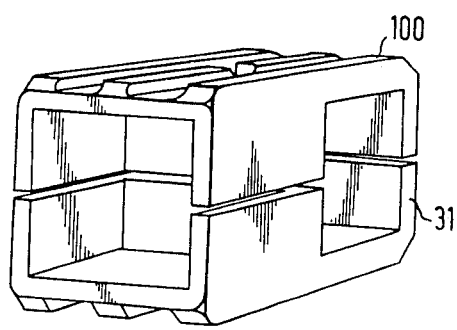

A kit conforming to the present invention comprises four clamp members which can be assembled to form at least six clamp assemblies. Only five such assemblies have been illustrated. The sixth one will be obtained when the upper or the lower half of the assembly according to FIG. 9 is complemented by a member A of FIG. 7.

Figure 1:
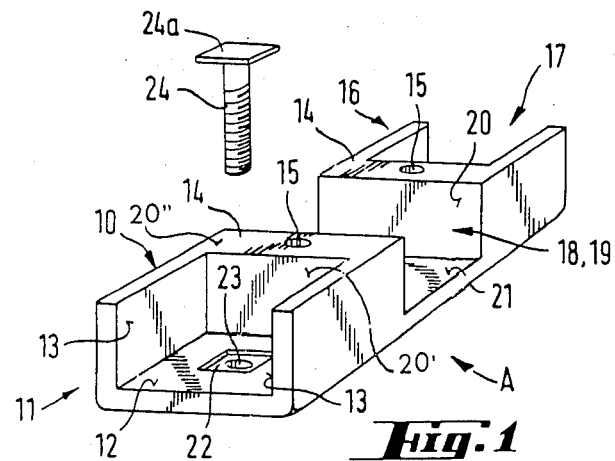
FIG. 1 is a perspective view of a first embodiment of clamp member conforming to the invention.

According to FIG. 1, a first embodiment of clamp member A of the invention is a unitary body die-cast from aluminum alloy. Member A has at one end a first part 10 defining a portion 11 of a square section socket (to be later described). Part 10 is U-shaped in cross-section, having a base 12 and upstanding side walls 13 whose height is somewhat less than half the width of the base 12. The side walls terminate at a transverse block 14 through which passes an aperture 15 for fixing the member to another similar member. At the other end, member A has a part 16 identical to part 10 but facing away from it. A second transverse block is also provided and a second, central portion 18 of member A is constituted by a transverse channel 19 which can form a half-portion of a rectangular-section recess disposed at right angles to the sockets. The transverse blocks 14 have two side faces 20,20' and a top face 20". The height of side faces 20 defining the side walls of the channel 19 is somewhat less than half the width of a base 21 thereof. The base 12 of each part 10, 16 has a rectangular shallow recess 22 surrounding an aperture 23. This enables a fastener screw 24 to be mounted captive in an assembly including member A, and used to secure an auxiliary fitting thereto. The depth of the recess 22 corresponds to the thickness of the head 24a of the screw or fastener 24. The same applies to the cut-away portions 44 of FIG. 5, later described more in detail.

Figure 2:
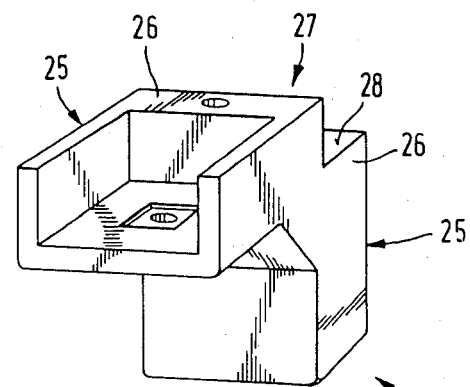
FIGS. 2 to 4 are similar views of second, third and fourth clamp members conforming to the invention.

A second embodiment of clamp member B of the invention according to FIG. 2 is also a unitary die-casting of aluminum alloy and comprises a pair of limbs 25 arranged at right angles to each other. Each free end portion of limb 25 is similar to the first part 10 of member A and each has a transverse apertured block 26. At the junction of the limbs 25, and defined by side walls 28 of blocks 26, the member B has a quarterportion 27 of a square-section recess; the height of whose walls 28 is somewhat less than half the width of a square-section elongate element with which it is to be used.

Figure 3:
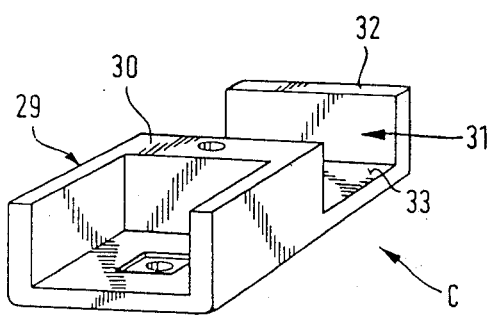

A third embodiment of clamp member C of the invention according to FIG. 3 has a first part 29, similar to part 10 of member A, and a transverse apertured block 30. On the other side of block 30 is a transverse channel 31 having one wall defined by a face of block 30 and the other by an upstanding end wall 32. The heights of wall 32 and the face of block 30 are somewhat less than half the width of a base 33 of channel 31.

Figure 4:
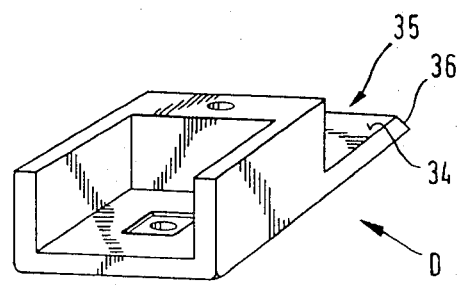

A fourth embodiment of clamp member D of the invention according to FIG. 4 is similar in all respects to member C, save that it does not have end wall 32, and a free edge of a base 34 of a transverse recess-portion 35 is chamfered at 36 to enable it to form part of a mitre joint.

The clamp members A, B, C, D of the invention can be assembled in various combinations to form a range of clamp assemblies (FIGS. 5 to 9), each suitable for use in a framework (not shown) comprising a plurality of elongate and conveniently hollow square-section members (also not shown), hereinafter referred to as "tubes".

According to FIG. 5, a first clamp assembly 37 of the invention is composed of two clamp members A disposed opposite each other. Together, the members A define a pair of oppositely directed aligned square-section sockets 42 and a transversely extending square-section recess 43. A pair of screws or bolts with nuts, such as 119, 119A (FIG. 10), can be used to fix the two members A in clamping relationship with end portions of two aligned tubes whose axes are indicated at 38 and 39 and which engage in sockets 42 and also with a central portion of a tube whose axis is indicated at 40, 41 and which lies in recess 43 to form a cross-over junction. Alternatively, the third mentioned tube can terminate in the recess 43 to form a T-junction, or two such tubes can terminate there, introduced therein each from one side. With recess 43 unoccupied, assembly 37 can serve as a straight connector.

FIG. 5 also illustrates how an adjacent pair of outer walls (side walls) 13 of members A can have cut-away portions 44 which together can accommodate a head 45 of a fastener screw 46 similar to screw 24. Such cut-away portions 44, and shallow recesses 22 with apertures 23 (FIG. 1), can be provided on the inside of each outer wall of each clamp member A, B, C, D, to be used for fasteners enabling the attachment of auxiliary fittings such as wall panels etc. to a framework.

A second clamp assembly 47 of the invention (FIG. 6) is composed of one clamp member A and two clamp members B. The assembly 47 can engage and clamp end portions of aligned tubes whose axes are indicated at 48, 49, an end portion of a tube whose axis is indicated at 50, and a central portion of a tube whose axis is indicated at 51—51. This forms, as illustrated, a horizontal crossover junction with a pillar beneath. Alternatively, if a tube whose axis lies on 51—51 terminates in the assembly 47, a T-junction with one horizontal arm is formed.

A third clamp assembly 54 of the invention (FIG. 7) is composed of two clamp members C which together define a socket 52 and a recess 53. This assembly 54 can be used to form a right-angled connection between two tubes, one whose axis lies on line 55 and whose end portion engages socket 52, and the other whose axis lies on line 56 and whose end portion engages recess 53. Alternatively, a T-junction can be formed between a tube whose axis lies on line 55 and a tube whose axis lies on line 56.

A fourth clamp assembly 57 (FIG. 8) is made up of one member B and two members D which together define two sockets 58, 59 and a transverse recess 60. This assembly 57 can be used to form an angle joint between tubes whose axes lie on line 61, 62 at one end of a tube which lies on line 63 and whose end portion is disposed in recess 60. Alternatively, the aforesaid angle joint can be intermediate the ends of a tube whose axis lies on line 63.

A fifth clamp assembly 64 of the invention (FIG. 9) is made up of four members B which together define four sockets 65 and a transverse recess 65. This assembly 64 can be used to form a junction in the form of a crossover (four tubes whose axes lie on lines 65, 66, 67, 68) in combination with an end or intermediate portion of a tube whose axis lies on line 69.

It will be appreciated that using the various clamping assemblies described in combination with various tubes, demountable frameworks can be built up in a variety of shapes and configurations.

The invention is not limited to the precise details of the foregoing, and variations can be made thereto. For example the various assemblies can be used in dispositions other than those shown. Further, by suitable dimensioning of the clamp members, they can be used with elongate elements which are oblong in cross-section and/or which are solid rather than hollow. The fixing means need not comprise the described apertures and screws or bolts. For example, each clamp member could have a projecting pin or a pin-receiving socket capable of engaging a complementary pin receiving socket or pin on an adjointed clamp member with a snap or friction fit sufficient to maintain the clamping relationship. As a further possibility external clamps or straps could be used. The kit of the invention can comprise a number of clamp members different from 4, i.e. 2, 3 or more than 4 clamp members, each such kit having its members capable of being united to form a number of clamp assemblies greater than the number of members.

In the embodiment according to FIGS. 10 to 12, a circular depression 22' is provided in the middle of the base 12, and in the middle of this depression a through bore 23 is provided. The fastener 124 has in this case a circular head 125 according to FIG. 12. The stem can of course also have circular cross-section and can be provided with a screw thread. It will be however readily understood that also the depressions 44 (FIG. 5) which are provided adjacent to the wall edge can be shaped with a circular periphery, and that it then may be advantageous to let the stem 126 have a rectangular cross-section, as shown in FIG. 12, because in this manner, thanks to shape engagement of this stem with the wall edges, locking of the fastener 124 against rotation is achieved.

Up to now only clamp assemblies for rectangular tubes have been shown. The invention can however also be used in connection with tubes with another profile, such as hexagonal, or even with cylindrical tubes, i.e. tubes with circular cross-section. In FIG. 13 a cross-section is shown through a clamp member AA pertaining to a clamp for cylindrical tubes. This cross-section corresponds to the cross-section of FIG. 11. The fastener 140 is shown with its stem 142 partially in the aperture 23. The head 141 has its upper face 141' shaped with the same cylindrical curvature as the inner face of the clamp element. Consequently, the fastener 140 is locked against rotation about the axis of the stem 142 by shape engagement between the said face 141' and the cylindrical tube (not shown) in the clamp assembly. It will be appreciated that even in a "cylindrical" clamp member such as AA, depressions 44 (FIG. 5) placed adjacent the wall edge may be provided, and that locking against rotation may be achieved e.g. by means of a rectangular cross-section of the stem 142 in accordance with FIG. 12. Generally, it may be stated that a fastener may be locked against rotation about the axis of its stem by shape engagement between this stem or the head and an adjacent part such as the clamp member itself or a tube therein. Locking against rotation may however also be totally ignored, particularly when other means of connection than screw threads are selected for the mounting of the auxiliary fittings.

It will be appreciated that in the embodiment according to FIG. 5 nothing can be seen of the arrangement for mounting a fixing element on the outside of the clamp, if in the recesses 44 no fastener is inserted, because no special hole needs to be prepared for the step portion to pass through.

If desired, the outer end of each aperture 23 can be closed by a knock-out plug connected to the body of the clamp member by a frangible annulus, so that the outer smooth surface of the member is not impaired when a fastener is not required.

Figure 18:
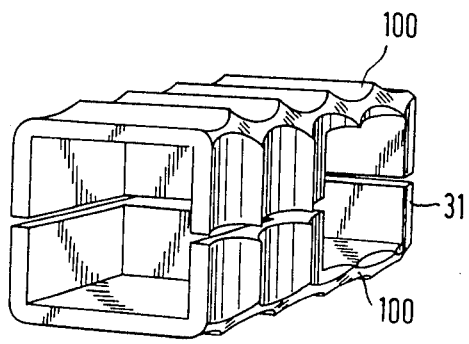

Many other variations are possible within the scope of the following claims. As an example, in FIGS. 14 to 17 are shown clamp assemblies made of clamp members of the type C according to FIG. 3 or 10 (but without depression for a fastener's head) decorated on two of their outer faces 100. The decorations can also be two-dimensional, e.g. in the form of engravings etc. In FIG. 18 a clamp assembly is shown which is decorated on four or five (in dependence on if the rear face, not visible in the drawing, is decorated or not) of its six outer faces 100. It will be readily understood that also clamp members other than of type C can be similarly decorated.

I claim:

1. A clamp member being together with other equally shaped and differently shaped clamp members and with the aid of fixing means assemblable to different types of clamp assemblies for uniting at least two elongated elements such as rods or tubes with the identical cross-section, said clamp member comprising at least one first part defining a portion of a recess for engaging a non-flanged and non-slotted end portion of one elongated element, and one second part defining a portion of a through-channel for engaging any non-flanged and non-slotted portion of another elongated element disposed at right angles to the afore-mentioned elongated element, each of said first and second parts being limited by outer walls having internal and external faces, wherein said internal faces are free of projections and each of said first part recesses are inside the clamp member terminated by a transverse block spanning the whole recess portion and having one top face and two opposite side faces, one of said transverse block side faces defining an end wall face of said respective first part recess and constituting thus a dead-end-socket for the said end portion of the one said elongated element, and the second of said transverse block side faces defining a portion of a side wall face of said through-channel, said fixing means being located inside the clamp member between said first part and said second part, and arranged in the central axial region of said transverse block.

2. A clamp member as claimed in claim 1, wherein the socket-forming recess and the through-channel in an assembled clamp are square in cross-section so as to non-rotatably accommodate said elongated elements having corresponding equal cross-section, the height of the side walls in the clamp member is less than half the width of the base wall between the internal faces of the side walls, said second side face of the transverse block is planar, and from the bottom edge thereof projects at right angles a planar surface defining together with said side face one corner portion of said through-channel.

3. A clamp member as claimed in claim 2 and having a pair of aligned and oppositely directed first parts, each constituting a half-portion of a socket, and separated one from the other by a planar connecting plate defining said projecting surface and dimensioned to constitute an interspace constituting a half-portion of said through-channel.

4. A clamp member as claimed in claim 2 and being an angle member comprising two limbs arranged at right angles to each other, each limb having an end portion constituting a respective first part, and the apex of the two limbs being rectangularly cut away to constitute a second part defining a quarter portion of said through-channel with square cross-section disposed at right angles to each limb, said second side faces of both transverse blocks being equally dimensioned and one of them constituting said projecting planar surface.

5. A clamp member as claimed in claim 2 and having one first part and one second part provided with an upstanding planar side wall at the end of said projecting surface and defining a half-portion of said through-channel.

6. A clamp member as claimed in claim 2 and having one first part and one second part defining a half-portion of said through-channel and being in the form of a plate defining said projecting surface and extending away from said first part on one side thereof and having its free edge bevelled to be capable of forming half of a miter joint.

7. A kit of clamp members assemblable with the aid of fixing means into different types of clamp assemblies for uniting at least two elongated elements such as rods or tubes with identical cross-section, each said clamp member comprising at least one first part defining a portion of a recess for engaging an end portion of one elongated element, and one second part defining a portion of a through-channel for engaging any portion of another elongated element disposed at right angles to the afore-mentioned elongated element, each of said first and second parts being limited by outer walls having internal and external faces, wherein each of said first part recesses are inside the clamp member terminated by a transverse block having one top face and two opposite side faces, one of said transverse block side faces defining an end wall face of said respective first part recess and constituting thus a dead-end-socket for the said end portion of the one side elongated element, and the second of said transverse block side faces defining a portion of a side wall face of said through-channel, said first parts and said transverse blocks having the same dimensions in all clamp members and the kit comprising the following types of clamp members:

(a) a clamp member having a pair of aligned and oppositely directed first parts, each constituting a half-portion of a socket, and separated one from the other by an interspace constituting a half-portion of said through-channel;

(b) an angle member comprising two limbs arranged at right angles to each other, each limb having an end portion constituting a respective first part, and the apex of the two limbs being cut-away to constitute a second part defining a quarter portion of said through-channel disposed at right angles to each limb;

(c) a clamp member having one first part and one second part provided with an upstanding side wall and defining a half-portion of said through-channel; and (d) a clamp member having one first part and one second part defining a half-portion of said through-channel and being in the form of a plate extending away from said first part on one side thereof and having its free edge bevelled to be capable of forming a half of a miter joint.

8. A kit as claimed in claim 7, wherein the socket-forming recess and the through-channel in an assembled clamp are square in cross-section, said outer walls including two side walls and one base wall, and the height of the side walls in each clamp member is less than half the width of the base wall between the internal faces of the side walls.

9. A clamp assembly made from the kit of claim 7 comprising two type A clamp members.

10. A clamp assembly made from the kit of claim 7 comprising one type A clamp member and two type B clamp members.

11. A clamp assembly made from the kit of claim 7 comprising two type C clamp members.

12. A clamp assembly made from the kit of claim 7 comprising one type B clamp member and two type D clamp members.

13. A clamp assembly made from the kit of claim 7 comprising four type B clamp members.

14. A clamp and framework assembly comprising a plurality of clamp assemblies each clamp assembly made from at least two different type clamp members selected from the kit of claim 7 and secured together in a clamping relationship with elongated elements of a framework.

15. A kit as claimed in claim 7, each clamp member further including fixing means located inside the clamp member between said first part and said second part, and arranged in said transverse block.

16. A clamp member as claimed in claim 15, and having a pair of aligned and oppositely directed first parts, each constituting a half-portion of a socket, and separated one from the other by an interspace constituting a half-portion of said through-channel.

17. A clamp member as claimed in claim 15, and being an angle member comprising two limbs arranged at right-angles to each other, each limb having an end portion constituting a respective first part, and the apex of the two limbs being cut-away to constitute a second part defining a quarter portion of said through-channel, disposed at right angles to each limb.

18. A clamp member as claimed in claim 15, and having one first part and one second part provided with an upstanding side wall and defining a half-portion of said through-channel.

19. A clamp member as claimed in claim 15, and having one first part and one second part defining a portion of said through-channel and being in the form of a plate extending away from said first part on one side thereof and having its free edge bevelled to be capable of forming a half of a miter joint.

20. A clamp member, assemblable with at least one other clamp member to a clamp assembly for tightly encompassing and uniting at least two elongated elements such as rods or tubes, comprising at least two parts each defining a portion of a recess for engaging one elongated element and being limited by outer wall having external and internal faces, wherein in the internal face of at least one of said outer walls a depression is arranged for accommodating at least a part of a head of an attachment means for an object extraneous to the clamp member and the elongated elements and having a head located inside said outer walls in contact with said elongated element, and a stem, narrower than said head and extending from said head outwardly of said outer walls, said depression being associated with an aperture through which said stem can pass to the outside of the clamp member.

21. A clamp member as claimed in claim 20, wherein said aperture passes through a central portion of an outer wall and the depression surrounds all sides of the aperture.

22. A clamp member as claimed in claim 20, wherein the depression is formed in an edge portion of an outer wall, which portion in assembled state faces a corresponding edge portion of the other clamp member and is spaced therefrom by a mounting gap constituting said associated aperture.

23. A clamp member, being part of a kit comprising a plurality of different clamp members assemblable with the aid of fixing means to different types of clamp assemblies for uniting at least two elongated elements such as rods or tubes, said clamp member comprising at least one first part defining a portion of a recess for engaging an end of one elongated element, and one second part defining a portion of a through-channel for engaging another elongated element disposed at right angles to the afore-mentioned elongated element, each of said first and second parts being limited by outer walls having internal and external faces, wherein each of said first part recesses are inside the clamp member and terminated by a transverse block having one top face and two opposite side faces, one of said transverse block side faces defining an end wall face of said respective first part recess and constituting thus a dead-end-socket for the end portion of the one said elongated element, the second of said transverse block side faces defining a portion of a side wall face of said through-channel, and said clamp having one first part and one second part defining a portion of said through-channel and being in the form of a plate extending away from said first part on one side thereof and having its free edge bevelled to be capable of forming a half of a miter joint.

24. A clamp member, assemblable with at least one other clamp member to a clamp assembly for uniting at least two elongated elements such as rods or tubes, comprising at least two parts each defining a portion of a recess for engaging one elongated element and being limited by outer walls having external and internal faces, wherein in the internal face of at least one of said outer walls a depression is arranged for accommodating at least a part of a head of a fastener element having a head and a therefrom protruding elongated stem, said depression being associated with an aperture through which said stem can pass to the outside of the clamp member, wherein the depression is formed in an edge portion of an outer wall, which portion in assembled state faces a corresponding edge portion of the other clamp member and is spaced therefrom by a mounting gap constituting said associated aperture.

25. A clamp member, assemblable with at least one other clamp member to a clamp assembly for uniting at least two elongated elements such as rods or tubes, comprising at least two parts each defining a portion of a recess for engaging one elongated element and being limited by outer walls having external and internal faces, wherein in the internal face of at least one of said outer walls a depression is arranged for accommodating at least a part of a head of a fastener element having a head and a therefrom protruding elongated stem, said depression being associated with an aperture through which said stem can pass to the outside of the clamp member, wherein said aperture is at the outer face closed by a knock-out plug.

26. A clamp member, assemblable with at least one other clamp member to a clamp assembly for uniting at least two elongated elements such as rods or tubes, comprising at least two parts each defining a portion of a recess for engaging one elongated element and being limited by outer walls having external and internal faces, wherein in the internal face of at least one of said outer walls a depression is arranged for accommodating at least a part of a head of a fastener element having a head and a therefrom protruding elongated stem, said depression being associated with an aperture through which said stem can pass to the outside of the clamp member, wherein the depression is of noncircular shape and/or offset relative to the aperture to restrain the head of the fastener against rotation when engaged therewith.

27. A clamp member, being part of a kit comprising a plurality of different clamp members assemblable with the aid of fixing means to different types of clamp assemblies for uniting at least two elongated elements such as rods or tubes, said clamp member comprising at least one first part defining a portion of a recess for engaging an end of one elongated element, and one second part defining a portion of a through-channel for engaging another elongated element disposed at right angles to the afore-mentioned elongated element, each of said first and second parts being limited by outer walls having internal and external faces, wherein each of said first part recesses are inside the clamp member and terminated by a transverse block having one top face and two opposite side faces, one of said transverse block side faces defining an end wall face of said respective first part recess and constituting thus a dead-end-socket for the end portion of the one said elongated element, the second of said transverse block side faces defining a portion of a side wall face of said through-channel, further including fixing means located inside the clamp member between said first part and said second part, and arranged in said transverse block and having one first part and one second part defining a portion of said through-channel and being in the form of a plate extending away from said first part on one side thereof and having its free edge bevelled to be capable of forming a half of a miter joint.

28. A clamp member as claimed in one of claims 20 or 22, wherein said aperture is at the outer face closed by a knock-out plug.

29. A clamp member as claimed in any one of claims 20 to 22, wherein the depression is of non-circular shape and/or offset relative to the aperture to restrain the head of the fastener against rotation when engaged therewith.

* * * * *